(12) United States Patent
Farouki

(10) Patent No.: US 7,930,290 B2
(45) Date of Patent: Apr. 19, 2011

(54) PROVIDING VIRTUAL REALLY SIMPLE SYNDICATION (RSS) FEEDS

(75) Inventor: Karim T. Farouki, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 317 days.

(21) Appl. No.: 11/622,822

(22) Filed: Jan. 12, 2007

(65) Prior Publication Data
US 2008/0172370 A1 Jul. 17, 2008

(51) Int. Cl.
*G06F 7/00* (2006.01)
*G06F 17/30* (2006.01)
*G06F 15/16* (2006.01)

(52) U.S. Cl. ......................... 707/710; 707/726
(58) Field of Classification Search .......... 707/710, 707/726
See application file for complete search history.

(56) References Cited

U.S. PATENT DOCUMENTS

| | | | |
|---|---|---|---|
| 6,381,592 B1* | 4/2002 | Reuning | 707/3 |
| 7,089,309 B2 | 8/2006 | Ramaley | |
| 7,337,158 B2* | 2/2008 | Fratkina et al. | 706/45 |
| 2003/0135520 A1* | 7/2003 | Mitchell et al. | 707/200 |
| 2003/0187829 A1* | 10/2003 | Emura et al. | 707/1 |
| 2004/0199445 A1* | 10/2004 | Eder | 705/35 |
| 2005/0165615 A1 | 7/2005 | Minar | |
| 2005/0216516 A1 | 9/2005 | Calistri-Yeh | |
| 2005/0234856 A1* | 10/2005 | Baumhof | 707/1 |
| 2005/0262049 A1* | 11/2005 | Somppi | 707/3 |
| 2005/0289468 A1 | 12/2005 | Kahn | |
| 2006/0106668 A1 | 5/2006 | Kim | |
| 2006/0173985 A1* | 8/2006 | Moore | 709/223 |
| 2006/0206803 A1* | 9/2006 | Smith | 715/513 |
| 2006/0230021 A1 | 10/2006 | Diab | |
| 2006/0230416 A1 | 10/2006 | Brazell | |
| 2006/0242663 A1 | 10/2006 | Gogerty | |
| 2007/0027932 A1* | 2/2007 | Thibeault | 707/200 |
| 2008/0120129 A1* | 5/2008 | Seubert et al. | 705/1 |

FOREIGN PATENT DOCUMENTS

| KR | 1020060009695 | 2/2006 |
|---|---|---|
| KR | 1020060130157 | 12/2006 |
| KR | 1020070006507 | 1/2007 |

OTHER PUBLICATIONS

Daniel Gruhl et al., "The Web Beyond Popularity: A Really Simple System for Web Scale RSS," Proc. of the 15th International Conference on World Wide Web, May 23-26, 2006 Edinburgh, Scotland.
Mark Kowalkiewicz et al., "Towards More Personalized Web: Extraction and Integration of Dynamic Content from the Web," Proc. of the 8th Asia Pacific Web Conference AP Web 2006, Harbin, China: Springer Verlag.
Mark Nottingham & Robert Sayre, "The Atom Syndication Format," Internet Proposed Standard RFC 4287, Dec. 2005.
International Search Report with Written Opinion dated May 6, 2008.

* cited by examiner

*Primary Examiner* — Tony Mahmoudi
*Assistant Examiner* — Brian E Weinrich
(74) *Attorney, Agent, or Firm* — Shook, Hardy & Bacon L.L.P.

(57) ABSTRACT

A system, method, and computer-readable media are disclosed for providing virtual Really Simple Syndication (RSS) feeds to requesting users. In one aspect, an embodiment of the method may include receiving a search query for one or more virtual Really Simple Syndication feeds. The method further includes comparing a keyword to a database of keywords associated with the virtual Really Simple Syndication feeds. Additionally, the method includes determining which of the associated keywords match with the keywords. Moreover, the method includes providing the associated virtual Really Simple Syndication feeds that correspond to the matched keywords.

18 Claims, 5 Drawing Sheets

PROVIDING VIRTUAL REALLY SIMPLE SYNDICATION (RSS) FEEDS

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Today, many content publishers on the Internet can publish a list of recent articles or changes to articles in the form of Really Simple Syndication (RSS) feeds. An RSS feed is accessible by accessing a published URL on the Internet. The RSS feed generally is an XML file containing the recent articles and changes to articles published by the content provider. The content of an RSS feed may include, for example, a series of small snippets (one or two paragraphs for example) about various topics of interest published by the content provider. The snippets can be termed "atoms." The atom of the RSS feed may, for example, include an entire article or blog post, or it may include only part of an article or blog post.

Typically, a user can go the URL of the RSS feed and retrieve the RSS feed by copying the link of the URL to the RSS feed into a RSS reader. A RSS reader may be a program or webpage used by a user that provides, in a user interface, an organized view for the contents of multiple RSS feeds subscribed by the user at once. With the RSS reader, a user could go to a single webpage or could open a single program that manages a plurality of RSS feeds subscribed by the user. The RSS reader can have a list of the URLs associated with XML files, and can periodically go to the URL of an XML file to read the XML file and determine if the contents have changed since the last time it examined the file. If the RSS reader has determined that the contents have changed, it knows that there are new articles and can display the new articles/blog posts or a subset thereof designated in the XML file of the RSS feed.

A problem with current RSS feeds is that they do not provide updates to a user's specific topic of interest, but rather give updated material on the various topics provided by the supporting website which may include other items of information. For example, a user may be interested in purchasing a new cell phone and may opt to subscribe to RSS feeds of various technology websites in order to get the latest information in the cell phone industry. But instead of only providing information related to cell phones, the user may be provided with a multitude of updated information that may not be related to cell phones.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system, method, and computer-readable media are disclosed for providing virtual RSS feeds. In one aspect, the method may include creating virtual RSS feeds from XML files of actual/physical RSS feeds. The virtual RSS feeds may be generated by extracting subsets of information from the XML files, determining keywords for each subset of information, associating the keywords with each corresponding subset of information, and storing the keywords and subsets of information in a database. Once the database of virtual RSS feeds has been created, the system can respond to search queries from users for the virtual RSS feeds.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and comprise media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
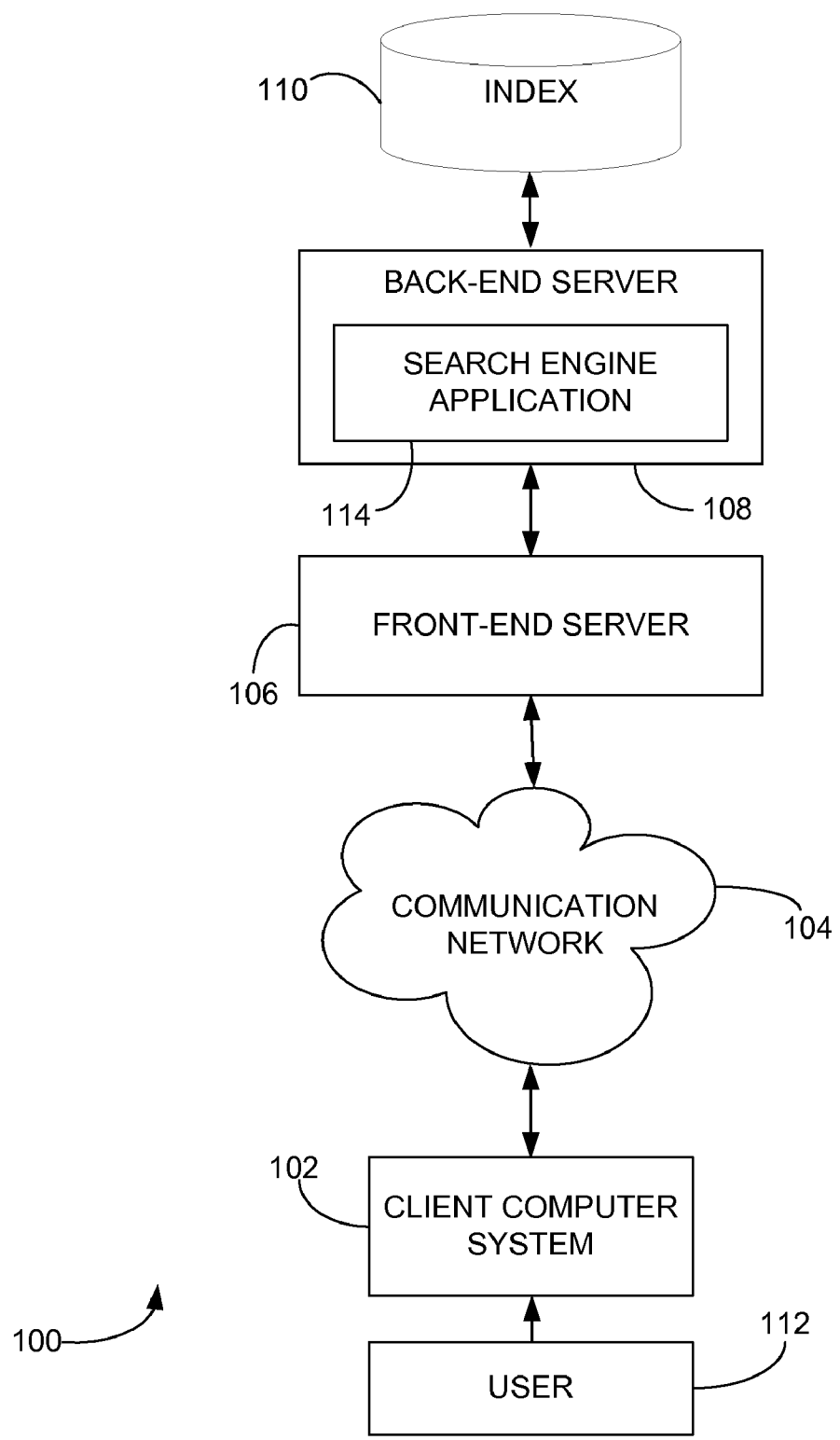
FIG. 1 a block diagram of an exemplary network environment for implementing the present invention.

Referring initially to FIG. 1, a block diagram of an exemplary network environment for implementing the present invention is shown and designated generally as network environment 100. Network environment 100 is but one example of a suitable environment and is not intended to suggest any limitation as to the scope of use or functionality of the invention. Neither should the network environment 100 be interpreted as having any dependency or requirement relating to any one or combination of elements illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, specialty computing devices, servers, etc. The invention may also be practiced in distributed computing environments where tasks are performed by remote-processing devices that are linked through a communications network.

Network environment 100 includes a client 102 coupled to a network 104 via a communication interface. The communication interface may be an interface that can allow the client to be directly connected to any other device or allows the client 102 to be connected to a device over network 104. Network 104 can include, for example, a local area network (LAN), a wide area network (WAN), or the Internet (or the World Wide Web). In an embodiment, the client 102 can be connected to another device via a wireless interface through a wireless network 104.

One or more servers communicate with the client 102 via the network 104 using a protocol such as Hypertext Transfer Protocol (HTTP), a protocol commonly used on the Internet to exchange information. In the illustrated embodiment, a front-end server 106 and a back-end server 108 (e.g., web server or network server) are coupled to the network 104. The client 102 employs the network 104, the front-end server 106, and the back-end server 108 to access Web page data stored, for example, in a central data index (index) 110.

Embodiments of the invention provide searching for relevant data by permitting search results to be displayed to a user 112 in response to a user-specified search request (e.g., a search query). In one embodiment, the user 112 uses the client 102 to input a search request including one or more terms concerning a particular topic of interest for which the user 112 would like to identify relevant electronic documents (e.g., Web pages). For example, the front-end server 106 may be responsive to the client 102 for authenticating the user 112 and redirecting the request from the user 112 to the back-end server 108.

The back-end server 108 may process a submitted query using the index 110. In this manner, the back-end server 108 may retrieve data for electronic documents (i.e., search results) that may be relevant to the user. The index 110 contains information regarding electronic documents such as Web pages available via the Internet. Further, the index 110 may include a variety of other data associated with the electronic documents such as location (e.g., links, or URLs), metatags, text, and document category. In the example of FIG. 1, the network is described in the context of dispersing search results and displaying the dispersed search results to the user 112 via the client 102. Notably, although the front-end server 106 and the back-end server 108 are described as different components, it is to be understood that a single server could perform the functions of both.

A search engine application (application) 114 is executed by the back-end server 108 to identify web pages and the like (i.e., electronic documents) in response to the search request received from the client 102. More specifically, the application 114 identifies relevant documents from the index 110 that correspond to the one or more terms included in the search request and selects the most relevant web pages to be displayed to the user 112 via the client 102.

Figure 2:
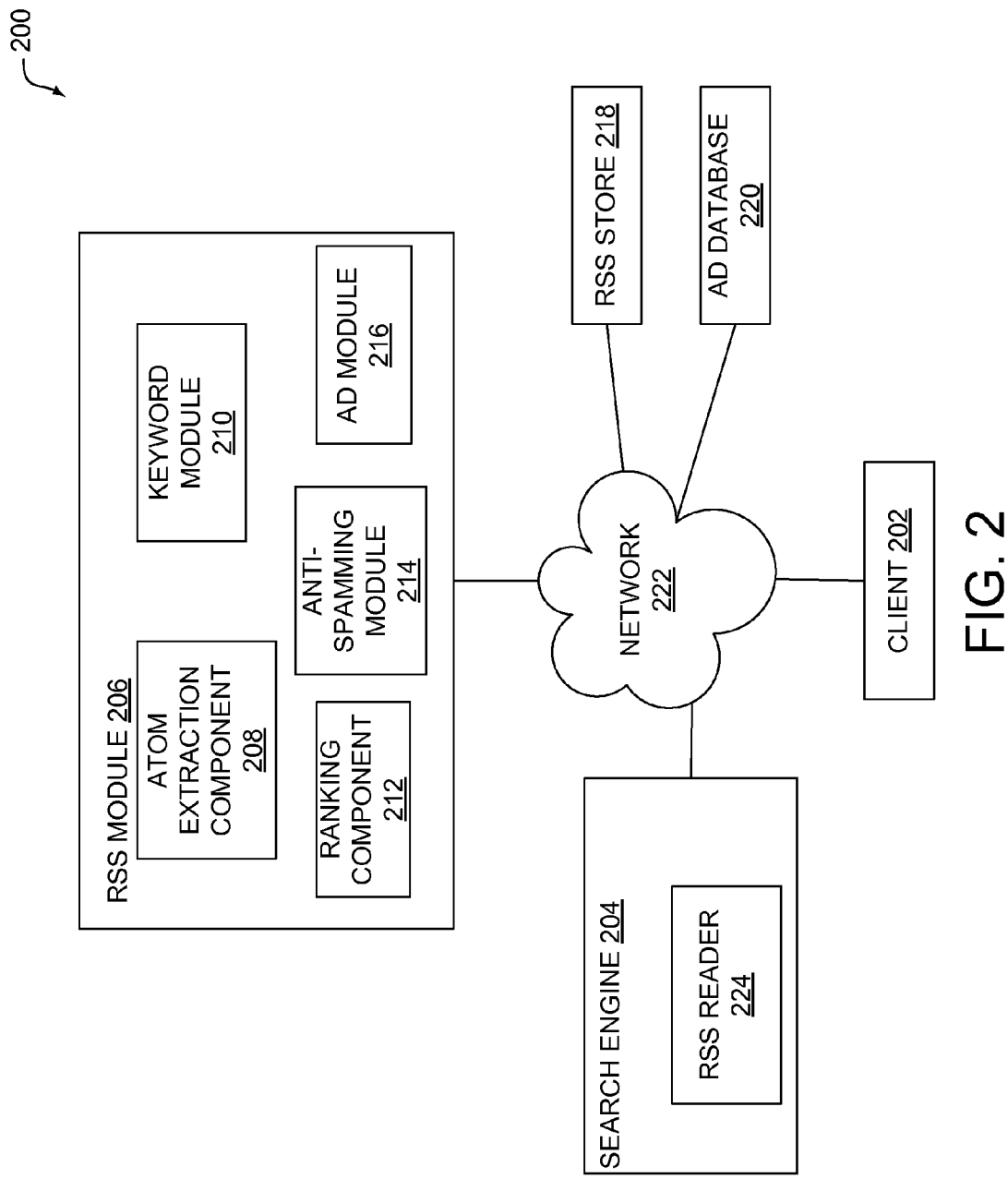
FIG. 2 is a block diagram of a system for implementing an embodiment of the invention.

FIG. 2 is a block diagram of a system 200 for implementing an embodiment of the invention. The system 200 can include client 202, search engine 204, RSS module 206, RSS store 218, advertisement database 220, and network 222. Each device 202, 204, 206, 218, and 220 may include a communication interface for communicating within one or more other devices over network 222. Network 222 may be the same as network 104 from FIG. 1.

Client 202 may be or can include a desktop or laptop computer, a network-enabled cellular telephone (with or without media capturing/playback capabilities), wireless email client or other client, machine or device to perform various tasks including Web browsing, search, electronic mail (email) and other tasks, applications, and functions. Client 202 may additionally be any portable media device such as digital still camera devices, digital video cameras (with or without still image capture functionality), media players such as personal music players and personal video players, and any other portable media device. Client 202 may also be or can include a server such as a workstation running the Microsoft Windows®, MacOS™, Unix™, Linux, Xenix™, IBM AIX™, Hewlett-Packard UX™, Novell Netware™, Sun Microsystems Solaris™, OS/2™, BeOS™, Mach™, Apache™, OpenStep™ or other operating system or platform.

Search engine 204, RSS module 206, RSS store 218, and advertisement database 220 may be or can include a server such as a workstation running the Microsoft Windows®, MacOS™, Unix™, Linux, Xenix™, IBM AIX™, Hewlett-Packard UX™, Novell Netware™, Sun Microsystems Solaris™, OS/2™, BeOS™, Mach™, Apache™, OpenStep™ or other operating system or platform. Search engine 204 can include components 106, 108, 110, and 114 from FIG. 1. In an embodiment, search engine 204 does not include front-end server 106. In an embodiment, the same entity managing search engine 204 is the same entity that manages RSS module 206, RSS store 218, and advertisement database 220. In such an embodiment, one or more of the RSS module 206, RSS store 218, and advertisement database 220 may be located within search engine 204. In another embodiment, one or more of the RSS module 206, RSS store 218, and advertisement database 220 may be integrated within each other while being external to the search engine 204. Search engine 204 may additionally include a RSS reader application 224 that can be used to generate a user interface (UI) for the user to provide RSS feeds for the search engine, or for the entity managing the search engine, to manage.

RSS store 218 is a database for storing content relating to the RSS feeds managed by the search engine 204. In an embodiment, RSS store 218 may be a cache that stores local copies of contents of XML files of the RSS feeds. The RSS store 218 may be, for example, configured in a manner that is similar to a hash table. In such an example, a hash key of the RSS store could be the URL of a particular RSS feed and the data stored in the hash table can include the updated and new contents of the RSS feed.

In an embodiment, in creating the RSS store 218, the search engine 204 may use one or more web crawlers to initially locate the feeds across the web. In such an embodiment, the web crawler can inspect a multitude of links found on the web to determine if any of the links are pointing to a web page that is actually a XML file having headers revealing a RSS feed. Once the web crawler locates such XML files, the web crawler can forward the XML files and the URLs of the XML files to the RSS module 206 for processing in order to be stored within RSS store 218. In another embodiment of creating the RSS store 218, the search engine can add RSS feeds to the RSS store 218 based on requests by users. For example, a user may utilize the search engine's RSS reader 224 to inform the search engine of one or more RSS feeds that the user wants the search engine 204 to manage by providing the search engine with the URL of the particular RSS feeds of interest. Once the search engine 204 has the URLs of the desired RSS feeds, the search engine 204 can forward the URLs and the corresponding XML files to the RSS module 206 for processing before storage within RSS store 218.

RSS module 206 can be configured to receive content related to RSS feeds aggregated by search engine 204. In an embodiment, such content can include the URL and the XML file of the RSS feed. An objective of the invention is to provide RSS feeds that are more specific to a user's needs or topics of interest. In achieving this objective, the invention creates dynamically-created virtual RSS feeds from actual RSS feeds that are customized to specific topics of interest for the user.

In order to create these virtual RSS feeds, the content within the XML file of an actual RSS feed is broken down to one or more smaller sets of information. Each individual smaller set of information is called an "atom." The atom may be the subset of information from a blog post or article that is within the XML file. For example, an atom may be a couple of lines from an article. In other embodiments, the atom may be a reference to relevant video or audio. In yet another embodiment, the atom may also be the entire blog post or article. RSS module 206 can use atom extraction component 208 to extract atoms from XML files of RSS feeds. Once an atom has been extracted from the XML file of an RSS feed, the atom can be stored within RSS store 218.

Core metadata about each atom can also be stored with the atom within RSS store 218. The core metadata can be used for determining the relevance of atoms in ranking applications. Such core metadata may include, but is not limited to, the RSS feed the atom belongs to, the timestamp of when the atom was created or stored within RSS store 218, the number of users that have accessed the atom, the average amount of time users spend viewing the atom, the number of people that have clicked on a link associated with the atom, and the ratings that users have given the atom.

In continuing with the objective of providing virtual RSS feeds that are more specific to potential topics of users' interests, keywords are also associated and stored with each atom within RSS store 218. The keywords can be used to identify the specific topics/ideas/subject matter that the content of the atom is related to. For example, if a particular atom was about a new cell phone that is about to come onto the market, some keywords that could be associated with the atom could be "GSM," "mobile phone," and "coming soon." The RSS module 206 can employ keyword module 210 for associating keywords with atoms to be stored in RSS store 218.

Keyword module 210 can use several techniques for generating keywords associated with atoms. In a first technique, the keyword module can be configured to extract keywords provided by authors of the XML file. In such a technique, content authors can provide keywords, that they believe are relevant, in the header of the XML files of their RSS feed. The keyword module 210 can then be configured to examine the headers of such XML files, extract the provided keywords, and associate the keywords with the corresponding atoms.

In another technique, the keyword module 210 can use one or more keyword extraction algorithms to extract relevant keywords from the atoms. There are several known keyword extraction algorithms that are currently used in web searching technology. Such known algorithms can be used by the keyword module 210 in order to extract and associate keywords with the corresponding atoms.

In yet another technique, the invention can be configured to allow users to submit keywords that they believe are relevant to a particular atom. For example, the RSS reader 224 may be configured to present the user with a UI on the user's client device that includes a free-form text box. Users can submit suggested keywords within the free-form text box. Such suggested keywords can be sent to the keyword module 210 in order to be associated and stored with the atom within RSS store 218. The keyword module 210 can be configured to require a minimum of N unique end users proposing the same keyword before the keyword is associated with the atom. Anti-spamming module 214 can be utilized to help ensure that the system is not being spammed by fraudulent keyword submissions. The anti-spamming module 214 may employ such techniques as, but not limited to, IP address detection and a mechanism that requires users to log-in and authenticate themselves before being authorized to submit suggested keywords. Once the keyword module 210 has obtained valid keywords, it can associate the keywords with the corresponding atom. In an embodiment, keyword module 210 can use a combination of one or more of the aforementioned keyword-determining techniques to generate keywords for each atom.

Sometimes users may not know how to locate RSS feeds that provide information of interest to the user. In such instances, the invention can be configured to allow users to submit search queries, including keywords corresponding to topics of interest, for virtual RSS feeds related to their interests. In an embodiment, the users can submit the search queries within a client-side UI generated by the RSS reader 224. In responding to the search query, search engine 204 can employ RSS module 206 to locate virtual RSS feeds, that comprise atoms and other information stored with the atoms, within RSS store 218 based on the keywords of the search query. The RSS module can utilize keyword module 210 to compare the keywords within the search query to keywords of associated atoms to find atoms that closely match the user's request. The level of similarity that the keywords must have to be considered matches can be determined using algorithms as determined by an administrator or developer of the system.

Once a list of matching atoms has been generated, the keyword module 210 can transmit the list to the ranking component 212 in order to rank the matched atoms in order of relevance before sending the list to the user. The ranking component 212 may use several techniques for ranking atoms. In a first technique, the ranking component 212 can use information from explicit rating submissions received by users that have previously rated the atoms. For example, when a user views a particular atom through the UI of the RSS reader 224, the RSS reader may expose a field within the UI that allows the user to explicitly state their feelings about the atom. In one example, there may be a numbered ranking scale that allows a user to pick a number that represents the level of satisfaction the user had with the atom. In another example, there may be a set of predefined responses that a user can select that defines their level of satisfaction with the atom. For example, the user may be able to select one of the following as an explicit rating: "Extremely Pleased," "Somewhat Pleased," and "Not Pleased." In yet another example, there user may be presented with a free-form text box that allows the user to freely type-in their opinion of the atom. Anti-spamming module 214 may also be employed to protect against fraudulent submission by users. Such explicit rating submissions can be associated and stored with each corresponding atom within RSS store 218 and can be retrieved by the ranking component 212 when it has to rank a set of atoms.

In another technique, ranking component 212 can rank atoms based on implicit rating submissions from users that have previously viewed the atoms. Implicit ratings can include information obtained while the user viewed an atom without having the user to explicitly state their feelings about the atom. For example, such implicit rating submissions can include the number of users that have accessed the atom, the average amount of time users spend viewing the atom, and the number of people that have clicked on a link associated with the atom. Such implicit rating submissions can be associated and stored with each corresponding atom within RSS store 218 and can be retrieved by the ranking component 212 when it has to rank a set of atoms.

In yet another technique, ranking component 212 can rank atoms based on a page-rank. A page-rank details the number of other sources (web pages/websites) that link to the particular atom or the actual/physical RSS feed of the atom. The search engine 204 can use web crawlers, for example, to determine the number of sources linking to the atom or actual/physical RSS feed of the atom. The page-rank can be associated and stored with each corresponding atom within RSS store 218 and can be retrieved by the ranking component 212 when it has to rank a set of atoms. In an embodiment, ranking component 212 can use a combination of the aforementioned ranking techniques to rank atoms.

Another aspect that the invention addresses is effective advertising within a RSS reader UI and proper payment to the content provider of the actual/physical RSS feeds that the virtual RSS feed derives from. Currently, there may be several advertisements displayed on the content provider's website that may generate revenue for the content provider when users click on such advertisements. However, there may be a concern that the virtual RSS feeds may become very appealing by providing a rich experience without users needing to go to the actual website of the content provider. If this is true, content providers may lose a substantial amount of revenue from unused advertisements on their website. This may lead to content providers refraining from publishing the entire contents of articles within their RSS feeds while leaving the majority of the content on their own website. For example, a content provider may have an article on its website that may be two paragraphs of the day's latest news information. However, the information that they've published in their RSS feed might include just the first two lines of the article instead of the full two paragraphs. The content provider may do this hoping that the first couple of lines get the reader's attention and will persuade the reader to click a link to the content provider's website, with the potential or hope that the user will click one of their advertisements at the website. If more and more content providers drive traffic back to their own pages for advertisement, there is a risk of drastically reducing the value of RSS readers and virtual RSS feeds.

The inventions provides ways for solving this potential problem by allowing content providers to add an extension to the current standard set of fields included within the XML file of their RSS feeds. The invention allows for content providers to provide information about how they would like to be paid for a share of revenue generated by users accessing advertisements displayed within the UI of the RSS reader when a virtual RSS feed related to their actual/physical RSS feed is displayed with such advertisements. Such payment information can be included within the header of the XML file of their RSS feed. For example, when providing a user with atoms of virtual RSS feeds, advertisement module 216 can be configured to search for advertisements within advertisement database 220 that are related to the provided atoms. In an embodiment, related advertisements can be determined by comparing the keywords associated with the atoms that were previously generated by keyword module 210 with keywords that are associated and stored with advertisements within the advertisement database 220. The advertisement module 216 can search for keywords within the advertisement database that closely match the keywords of the atoms and can provide the corresponding advertisements with the atoms to the user within the UI. The level of similarity that the keywords must have to be considered matches can be determined using algorithms as determined by an administrator or developer of the system. In another embodiment, the types of advertisements displayed with atoms may be predetermined by an administrator or developer and not based on keywords. In either embodiment, the search engine 204 or RSS module 206 can monitor and store in memory the number of times users click on advertisements when particular atoms are displayed in the UI of the RSS reader 224. This number can be inputted into an algorithm for determining the content provider's monetary share of the revenue generated by the advertisements. Once the amount has been determined, the entity managing the search engine can send payment to the content provider in the manner stated by the content provider in the header of the XML file of their RSS feed.

With this method, content providers should not feel the need to hide important information or the majority of the information of new or updated articles in an attempt to persuade users to come to their website in hopes that they'll click advertising links on their web page. Rather, content providers should be forthcoming and provide all of their information and be content that a user might read an entire article without ever going to the content provider's website because they still will get a share of revenue if a user clicks on an advertisement within the RSS reader. Additionally, content providers will now have another incentive to publish content in their RSS feeds that is as relevant and compelling as possible. Such an incentive may be so that users will spend more time reading their feeds which can enable their feeds to be ranked higher than others due to explicit and implicit rating submissions used by the ranking component 212 to rank virtual RSS feeds. By keeping more people engaged in the feeds, this in turn can help generate even more revenue by increasing the chances that users will click on advertisements displayed with the virtual RSS feeds.

Figure 3:
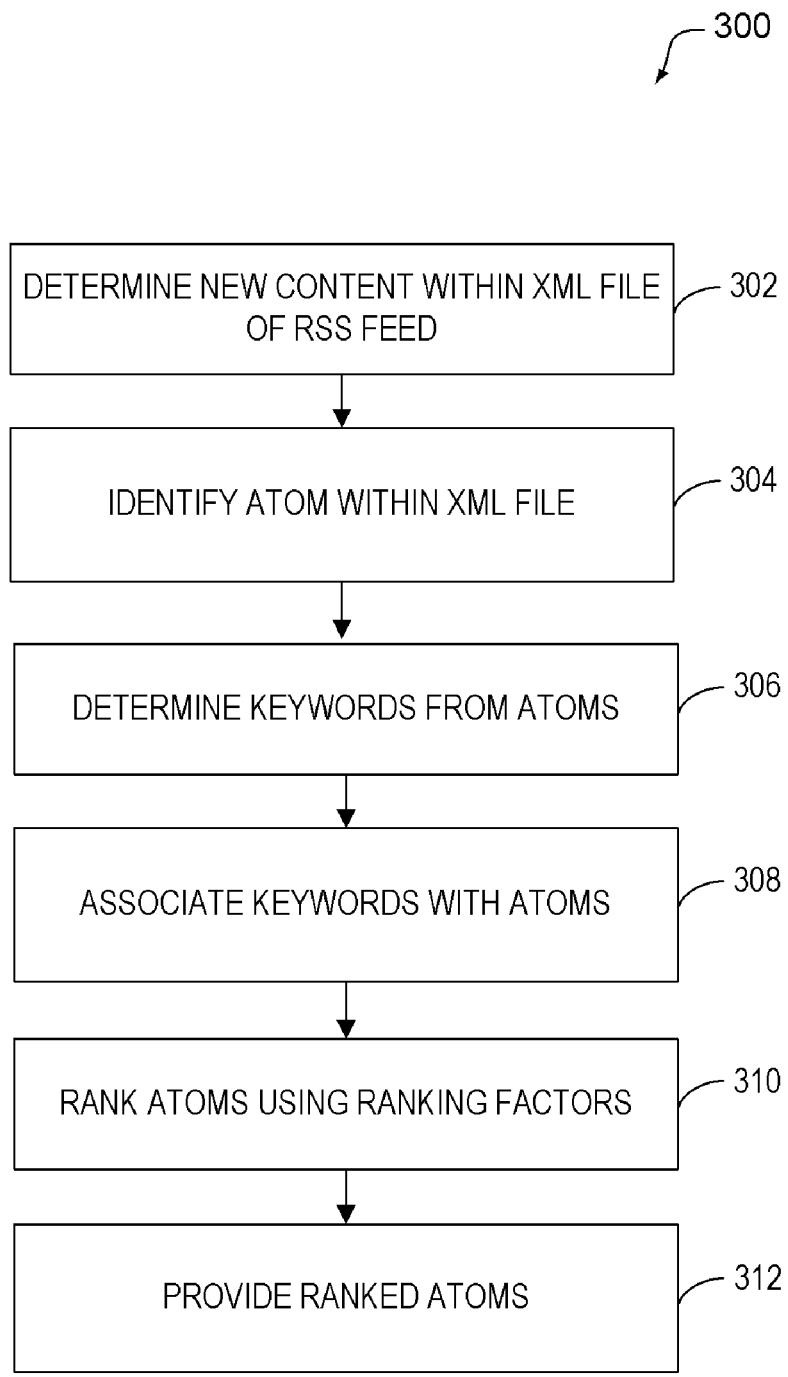
FIG. 3 is a flow diagram of an exemplary method for providing virtual RSS feeds.

FIG. 3 is a block diagram 300 of an exemplary method for providing virtual RSS feeds. At operation 302, presence of new content within an XML file of an RSS feed is determined. The new content can include information that was not present in the XML file in a previous examination of the file. The new content can be determined using web crawlers of a search engine. At operation 304, a subset of information within the XML file is identified. The subset of information may be, for example, an atom of information. At operation 306, one or more keywords are determined for each subset of information. A keyword module can be used to determine keywords using either a content provider keyword submission, a algorithmic keyword extraction, or a user keyword submission technique discussed previously. At operation 308, the determined keywords are associated with the subset of information. At operation 310, the subsets of information are ranked based on one or more ranking factors. The subsets of information may be ranked, for example, by a ranking component 212. The ranking factors may include one or more of an explicit rating submission, an implicit rating submission, and a page-rank discussed above. At operation 312, the ranked subsets of information are provided as virtual RSS feeds to a user in a UI of a RSS reader.

Figure 4:
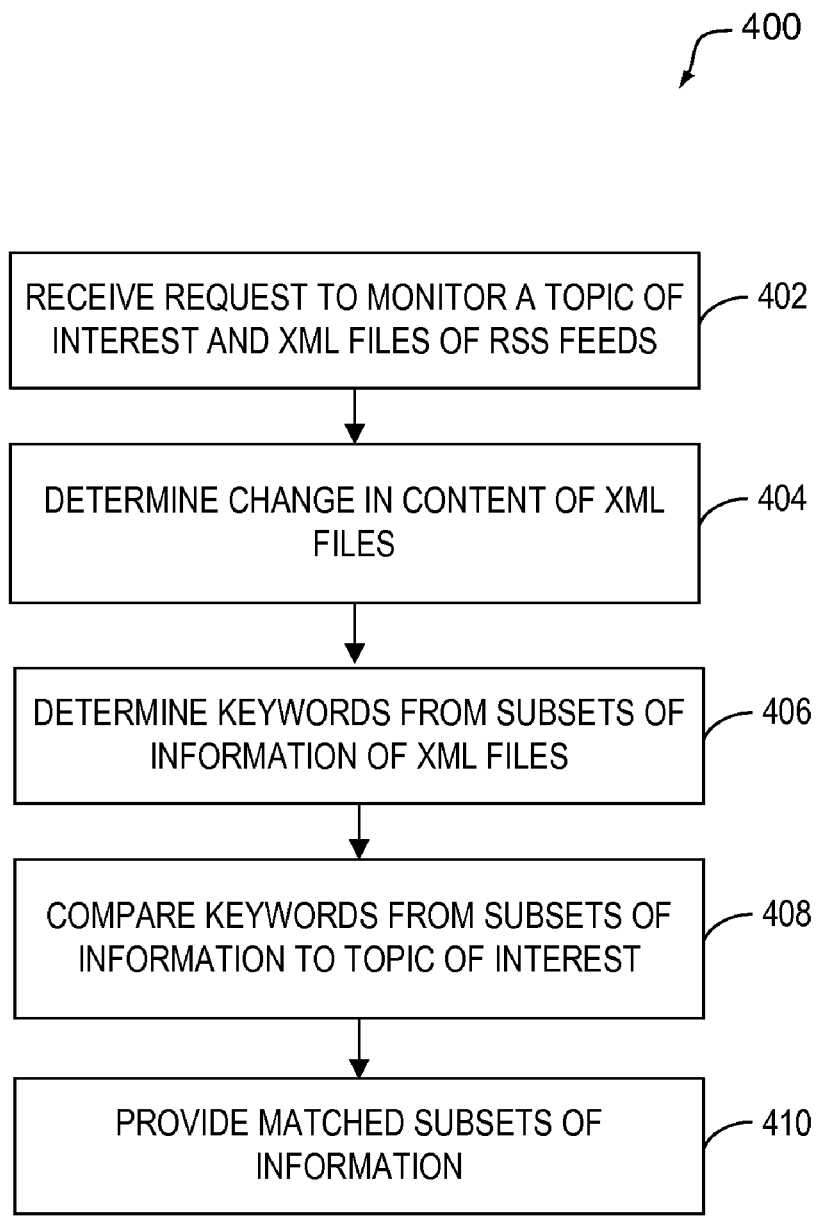
FIG. 4 is another flow diagram of an exemplary method for providing virtual RSS feeds.

FIG. 4 is another flow diagram of an exemplary method 400 for providing virtual RSS feeds. FIG. 4 additionally describes a method for providing virtual RSS feeds wherein the users provides actual/physical RSS feeds that he/she would liked to be monitored. At operation 402, a request is received to monitor a specific topic of interest and XML files related to content published by content providers on the Internet. The request may include text relating to the topic of interest and an URL relating to the location of the XML files. At operation 404, a change in content of the XML files is determined. The change can include new or updated information within the XML file and can be determined using web crawlers of a search engine. At operation 406, keywords are determined from subsets of information related to the XML files. The subsets of information may be atoms. A keyword module can be used to determine keywords using a content provider keyword submission, an algorithmic keyword extraction, or a user keyword submission technique discussed previously. At operation 408, the keywords are compared to the topic of interest for determining a subset of information that is related to the topic of interest. For example, a keyword module may be used to extract keywords from received topic of interest using a keyword extraction algorithm. Once keywords have been extracted from the topic of interest, they can be compared to the keywords of the subsets of information in order to find keywords that match each other. The level of similarity that the keywords must have to be considered matches can be determined using algorithms as determined by an administrator or developer of the system. At operation 410, the matched subsets of information are provided as virtual RSS feeds to a user in a UI of a RSS reader.

Figure 5:
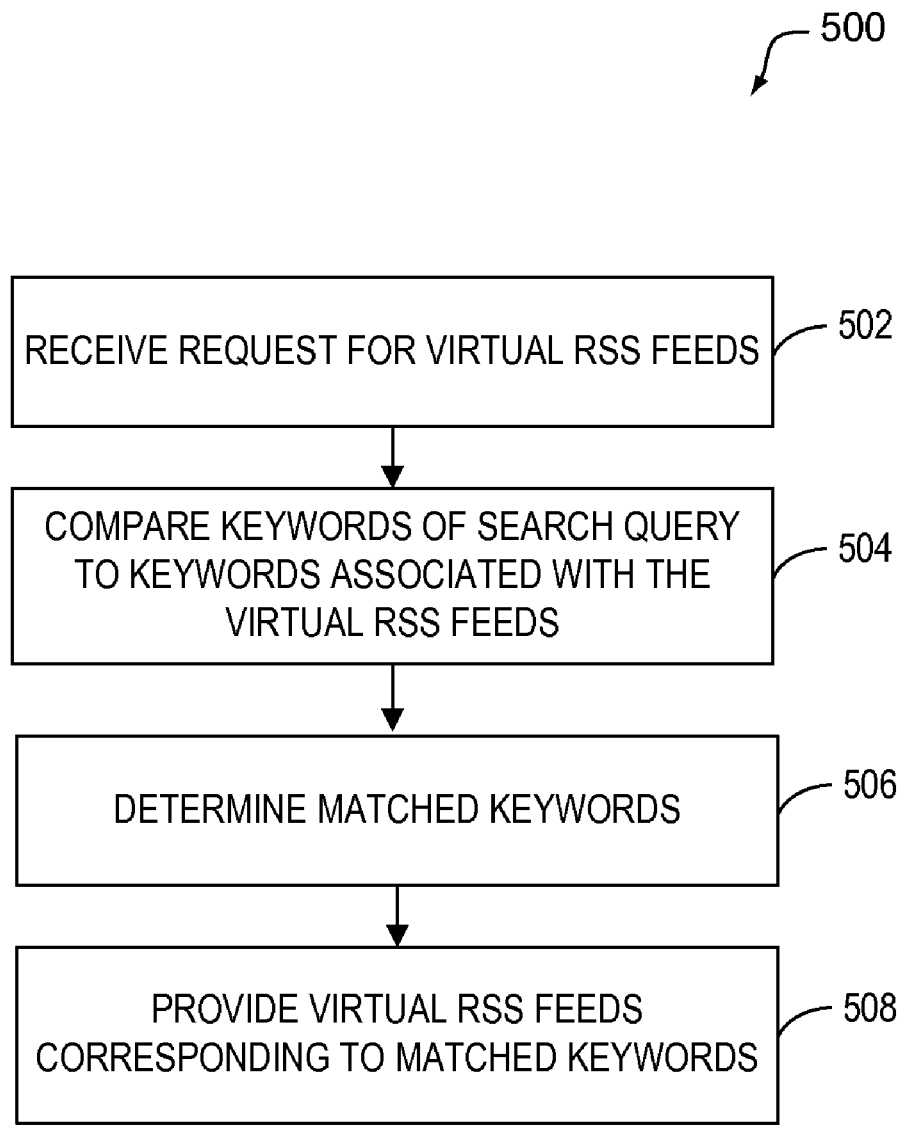
FIG. 5 is yet another flow diagram of an exemplary method for providing virtual RSS feeds.

FIG. 5 is yet another flow diagram of a method 500 for providing virtual RSS feeds. FIG. 5 additionally describes a method for providing virtual RSS feeds to users that may not know what virtual RSS feed will be most effective to their needs. At operation 502, a request is received for one or more virtual RSS feeds. The request may include one or more keywords that corresponds to a user's topic of interest, and may be received within a UI of a RSS reader. At operation 504, the keywords of the search query are compared to a database of keywords associated with a plurality of virtual RSS feeds. The keywords may be compared using a keyword module of a RSS module. At operation 506, a determination is made as to which of the keywords in the database match the keywords in the search query. The level of similarity that the keywords must have to be considered matches can be determined using algorithms as determined by an administrator or developer of the system. At operation 508, the associated virtual RSS feeds that correspond to the matched keywords are provided in the UI of the RSS reader.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

I claim:

1. A method for providing virtual Really Simple Syndication feeds, comprising:

determining a presence of a new content within at least one XML file published by a content provider on the Internet with a web crawler of a search engine, wherein the web crawler locates Really Simple Syndication feeds, the web crawler inspects links to determine if the links point to a web page that is the at least one XML file having headers revealing a Really Simple Syndication feed, the web crawler selects the at least one XML file having headers revealing the Really Simple Syndication feed, the web crawler forwards the at least one XML file and its link to a Really Simple Syndication module wherein the Really Simple Syndication module includes an atom extraction module, a keyword module, a ranking module, and an advertisement module, and the new content includes information that was not present in the at least one XML file in a previous examination of the at least one XML file;

separating the at least one XML file into atoms wherein at least one atom within the at least one XML file is identified, wherein the at least one atom is extracted from the at least one XML file, and wherein the at least one atom is a subset of information from a post within the at least one XML file;

determining one or more keywords for the at least one atom based on one or more keyword computation techniques wherein the determining one or more keywords comprises:

a) extracting the one or more keywords provided by authors of the at least one XML file, b) executing one or more keyword extraction algorithms to extract the one or more keywords from the at least one atom, c) receiving the one or more keywords relevant to the at least one atom from users, d) receiving the one or more keywords that have been proposed by a fixed number of users, and e) generating the one or more keywords from a combination of (a), (b), (c), and (d);

associating the one or more keywords with the at least one atom;

ranking the at least one atom based on core metadata associated with the at least one atom, wherein the core metadata is stored with the at least one atom, and wherein the core metadata comprises:

(1) at least a timestamp of when the at least one atom was created;

(2) a number of users that have accessed the at least one atom;

(3) an average amount of time users spend viewing the at least one atom;

(4) a number of people that have clicked on a link associated with the at least one atom; and (5) a rating that a user has given the at least one atom; and providing the at least one atom that is ranked.

2. The method according to claim 1, further comprising comparing at least one keyword within a search query to the one or more keywords in order to identify corresponding atoms to respond to the search query.

3. The method according to claim 1, wherein the one or more keyword computation techniques include at least one of a content provider keyword submission, an algorithmic keyword extraction, and a user keyword submission.

4. The method according to claim 1, wherein one or more ranking factors include at least one of an explicit rating submission, an implicit rating submission, and a page-rank.

5. The method according to claim 1, further comprising providing one or more advertisements with the at least one atom that is ranked.

6. The method according to claim 5, further comprising examining a header of the at least one XML file to determine a method of payment to the content provider.

7. The method according to claim 6, wherein the payment is based on a number of times users access the one or more advertisements.

8. One or more computer-storage media having computer-usable instructions executable by a computer thereon for performing a method for providing virtual Really Simple Syndication feeds, comprising:
receiving a request to monitor at least one specified topic of interest for one or more XML files relating to content published by one or more content providers, wherein receiving a request comprises receiving text and a URL related to the one or more XML files;
determining a change in content within the one or more XML files using one or more web crawlers of a search engine, wherein the one or more web crawlers locate Really Simple Syndication feeds, the one or more web crawlers inspect links to determine if the links point to a web page that is an XML file having headers revealing a Really Simple Syndication feed, the web crawler selects the at least one XML file having headers revealing the Really Simple Syndication feed, and the one or more web crawlers forward the XML file and its link to a Really Simple Syndication module, wherein the Really Simple Syndication module includes an atom extraction module, a keyword module, a ranking module, and an advertisement module, wherein the atom extraction module extracts at least one atom from the at least one XML file, wherein the keyword module generates keywords and associates keywords with the at least one atom, wherein the ranking module ranks the at least one atom, based on core metadata associated with the at least one atom, with other atoms received from the keyword extraction module, and wherein the advertisement module searches for advertisements that are related to the at least one atom wherein the core metadata is stored with the at least one atom, and wherein the core metadata comprises:
(1) at least a timestamp of when the at least one atom was created;
(2) a number of users that have accessed the at least one atom;
(3) an average amount of time users spend viewing the at least one atom:
(4) a number of people that have clicked on a link associated with the at least one atom; and
(5) a rating that a user has given the at least one atom; and providing the at least one atom that is ranked;
determining one or more keywords from the at least one atom associated with each of the one or more XML files, wherein the atom is extracted from each of the one or more XML files, wherein the at least one atom is a subset of information from a post within the at least one XML file and wherein the determining one or more keywords comprises extracting the one or more keywords from the at least one specified topic of interest wherein the determining one or more keywords comprises:
a) extracting the one or more keywords provided by authors of the at least one XML file,
b) executing one or more keyword extraction algorithms to extract the one or more keywords from the at least one atom,
c) receiving the one or more keywords relevant to the at least one atom from users,
d) receiving the one or more keywords that have been proposed by a fixed number of users, and
e) generating the one or more keywords from a combination of (a), (b), (c), and (d);
determining at least one matched atom that is related to the topic of interest; and
providing the at least one matched atom.

9. The media according to claim 8, further comprising ranking the at least one matched atom based on at least one of an explicit rating submission, an implicit rating submission, and a page-rank wherein the page-rank details a number of web pages that link to the at least one matched atom.

10. The media according to claim 8, wherein the one or more keywords are determined by at least one of a content provider keyword submission, an algorithmic keyword extraction, and a user keyword submission.

11. The media according to claim 8, wherein the at least one atom is a subset of at least one of an article and a blog post.

12. The media according to claim 8, further comprising providing advertisements with the at least one matched atom based on one or more keywords of the matched subset of information.

13. One or more computer-storage media having computer-usable instructions executable by a computer for performing a method for providing virtual Really Simple Syndication feeds, comprising:
receiving at least one keyword within a user interface of a RSS reader for one or more virtual Really Simple Syndication Feeds, wherein the one or more virtual Really Simple Syndication Feeds are respectively created from one or more actual Really Simple Syndication Feeds that are customized to specific topics of interests, and wherein the RSS reader is located in a search engine;
comparing the at least one keyword to a database of keywords associated with the one or more virtual Really Simple Syndication feeds using a keyword module located in a server, wherein the keyword module associates keywords with atoms by
a) extracting the keywords provided by authors of the at least one XML file,
b) executing one or more keyword extraction algorithms to extract the keywords from the atoms,
c) receiving the keywords relevant to the atoms from users,
d) receiving the keywords that have been proposed by a fixed number of users, and
e) generating the keywords from a combination of (a), (b), (c), and (d),
wherein the atoms are respectively subsets of content from posts within an XML file of an actual Really Simple Syndication feed;

determining which of the associated keywords match with the at least one keyword;

providing the associated virtual Really Simple Syndication feeds that correspond to the matched keywords within the user interface of the RSS reader; and providing the virtual Really Simple Syndication feeds corresponding to the matched keywords in a ranked order based on core metadata associated with the atoms, wherein the core metadata is stored with the atoms, and wherein the core metadata comprises:
  (1) at least a timestamp of when the at least one atom was created;
  (2) a number of users that have accessed the at least one atom;
  (3) an average amount of time users spend viewing the at least one atom;
  (4) a number of people that have clicked on a link associated with the at least one atom; and
  (5) a rating that a user has given the at least one atom.

14. The media according to claim 13, wherein the ranked order is based on an explicit rating submission wherein the explicit rating submission is a submission provided by a user that includes a sentiment of the user.

15. The media according to claim 13, wherein the ranked order is based on an implicit rating submission.

16. The media according to claim 13, wherein the ranked order is based on a page-rank wherein the page-rank details a number of web pages or websites that link to the one or more virtual Really Simple Syndication Feeds.

17. The media according to claim 13, wherein the provided virtual Really Simple Syndication feeds include information from at least one of an article and a blog post.

18. The computer-readable media according to claim 13, further comprising providing advertisements with the associated virtual Really Simple Syndication feeds based the matched keywords.

* * * * *